United States Patent [19]

Maeda et al.

[11] Patent Number: 4,597,696
[45] Date of Patent: Jul. 1, 1986

[54] THROWAWAY INSERT

[75] Inventors: Jun Maeda; Yoshikatsu Mori, both of Itami, Japan

[73] Assignee: Sumitomo Electric Industries Ltd., Osaka, Japan

[21] Appl. No.: 713,918

[22] Filed: Mar. 20, 1985

[30] Foreign Application Priority Data

Jun. 28, 1984 [JP] Japan .............................. 59-98593[U]

[51] Int. Cl.⁴ ........................... B26D 1/00; B32B 1/04
[52] U.S. Cl. ..................................... 407/114; 428/80; 428/120; 428/542.8; 428/600
[58] Field of Search .............. 428/80, 120, 192, 542.8, 428/599, 600; 407/113, 2, 5, 6, 114

[56] References Cited

U.S. PATENT DOCUMENTS

| | | | |
|---|---|---|---|
| 3,815,192 | 6/1974 | Ohtsu et al. | 407/114 |
| 3,882,580 | 5/1975 | Lundgren | 407/113 |
| 4,318,645 | 3/1982 | McCreery | 407/114 |

*Primary Examiner*—Alexander S. Thomas
*Attorney, Agent, or Firm*—Ernest A. Beutler

[57] ABSTRACT

An improved throwaway insert is proposed which has a cutting edge, a land extending along and inside of the cutting edge, a breaker groove extending along and inside of the land, a flat central area enclosed by the breaker groove, and a plurality of semicircular projections arranged in a chip breaker groove at its corners and its straight portions to enable chip to be satisfactorily broken over wide ranges of the depth of cut and the feed. These projections rise from midway of the breaker groove until they become even with the central area enclosed by the breaker groove.

2 Claims, 14 Drawing Figures

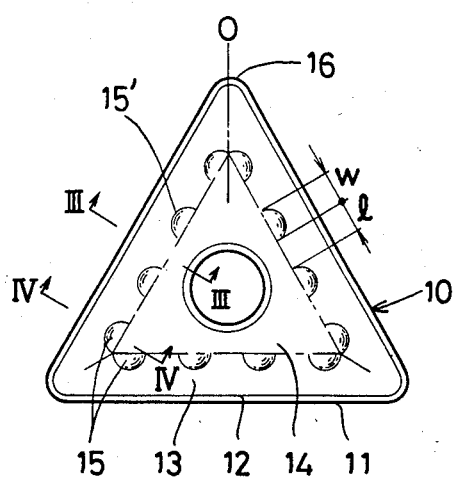
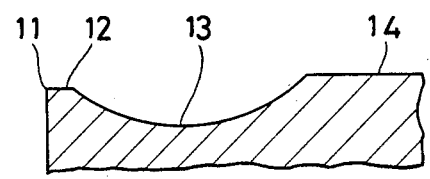
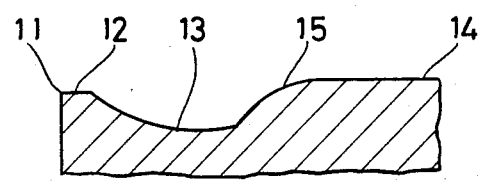
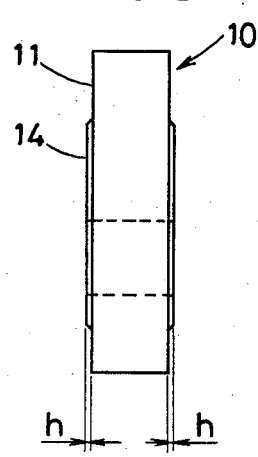
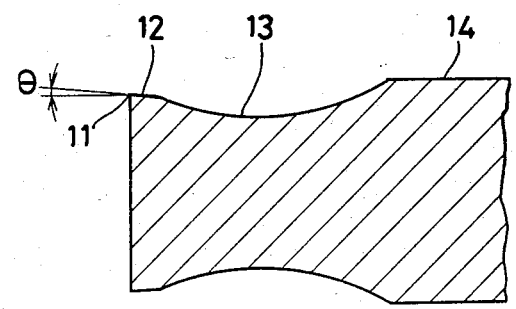
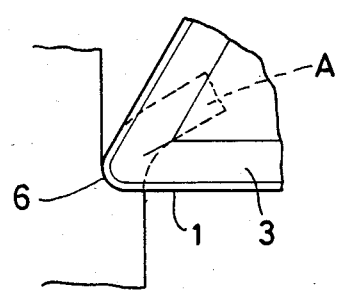
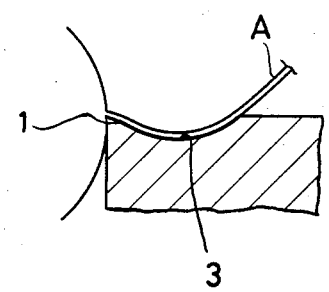

THROWAWAY INSERT

Figure 10:
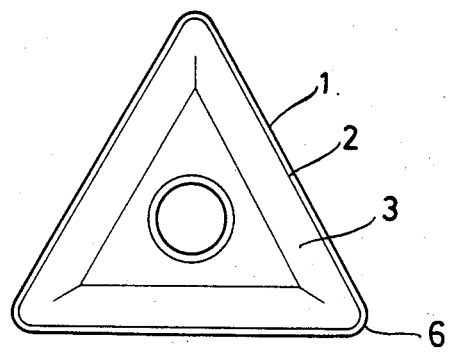
Figure 11:
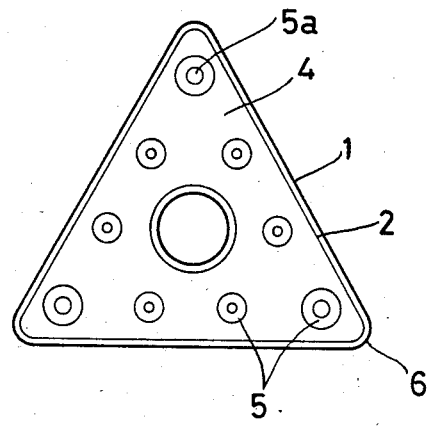

The present invention relates to improvements in polygonal throwaway inserts used to turn steel material. For inserts of this type, good chip breakability, high strength and good resistance to crater abrasion are required. As conventional inserts of this type, those shown in FIGS. 10 and 11 are known. The insert of FIG. 10 is formed with a breaker groove 3 of a uniform width along a land 2 of a cutting edge 1. The insert of FIG. 11 has a plurality of frustoconical of frustohemispherical projections 5 arranged in a required pattern on its upper surface (rake face) 4.

The former throwaway inserts (of FIG. 10) have the following shortcomings. Firstly, since the width of the breaker groove is larger at the corners than at its straight portions, the insert cannot provide a satisfactory chip breaking force when the depth of cut is small. Secondly, since the chip breaker groove has a uniform width as its straight portions, the strain applied to the chip, too, is uniform. Thus, when the feed is low and the chip is thin, the chip tends to come out without curling. When the feed is high, chip is liable to be stuffed. In other words, chip can be satisfactorily treated only within narrow ranges of the depth of cut and the feed.

With the latter insert (of FIG. 11) of a type permitting the use of both sides, flat top surfaces 5a of the small projections 5 provide support faces. But, the small projections are apt to wear due to the abrasion by chip, resulting in decreased support area and support strength. As a result, the insert might get damaged under the cutting load.

An object of the present invention is to provide an improved throwaway insert which obviates the above-mentioned shortcomings.

In accordance with the present invention, there is provided a polygonal throwaway insert having a cutting edge, a land provided along and inside of said cutting edge, a breaker groove of a uniform width extending along and inside of said land, and a flat central area enclosed by said breaker groove and having a shape symmetrical to the shape of the insert, the insert further comprising a pair of projections formed at each corner of said central area so as to be symmetrical to each other with respect to a bisector of the corner, and a plurality of projections arranged at regular spacings along each of the straight sides of said central area, all of the projections having a semicircular shape in plan and starting from midway of the breaker groove until they become even with said central area.

With the insert according to the present invention, the central area provides a stable support force if it is even with or above the level of the cutting edge to allow use of both sides. In cutting with a small depth of cut, one of the projections provided symmetrically at each corner of the central area are positioned in front of chip flow to give a breaking strain to the discharged chip. In cutting with a large depth of cut or by use of a straight portion of the cutting edge, even if the feed is small, one of the projections provided along the straight side of the central area gives an irregular breaking strain to the chip. Thus, the chip can be treated over wide ranges of the depth of cut and the feed.

Figure 7A:
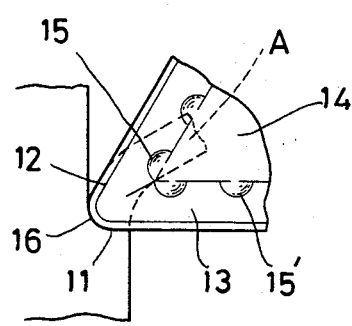
Figure 7B:
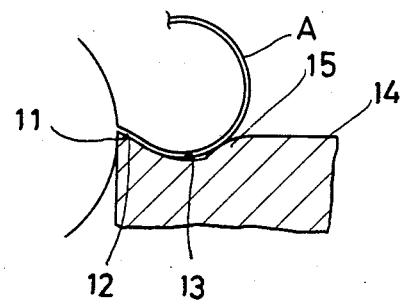
Figure 12:
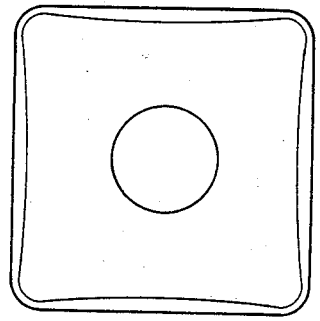
Figure 8:
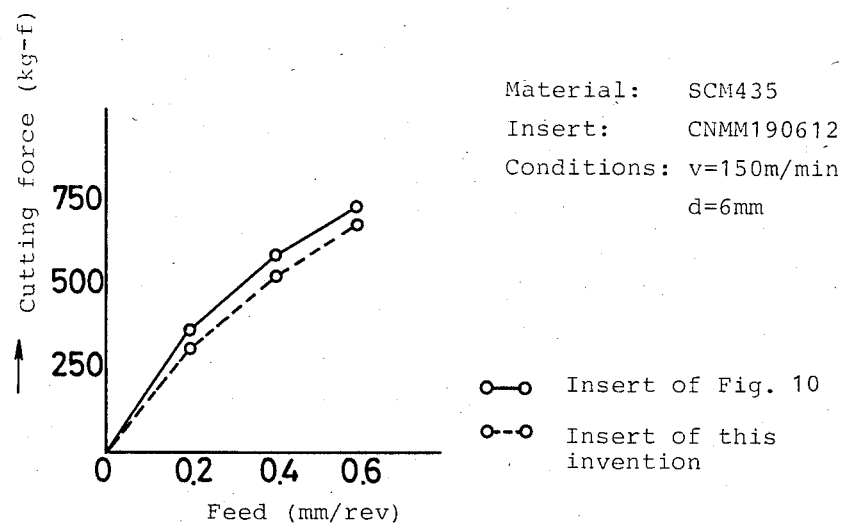
Figure 9:
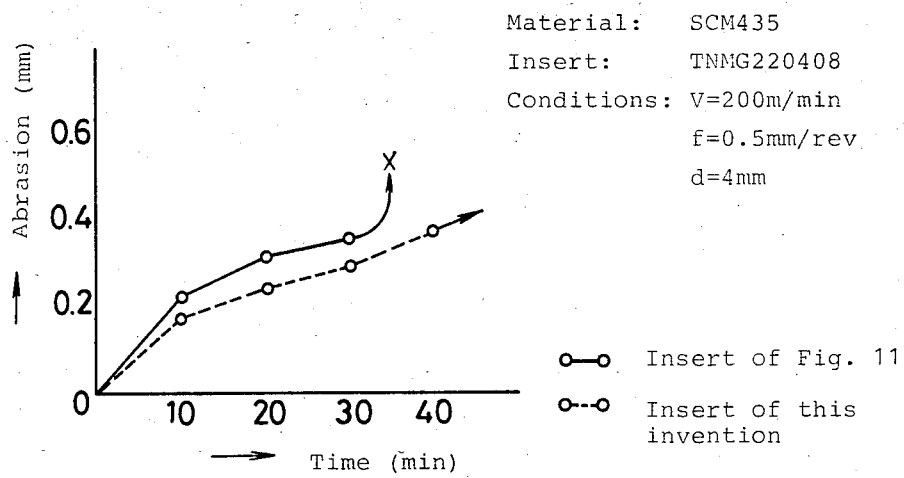

Other features and advantages of the present invention will become apparent from the following description taken will reference to the accompanying drawings, in which:

FIG. 1 is a plan view of a throwaway insert embodying the present invention;
FIG. 2 is a front view thereof;
FIG. 3 is a sectional view taken along the line III—III of FIG. 1;
FIG. 4 is a sectional view taken along the line IV—IV of FIG. 1;
FIG. 5 is a sectional view showing another example of a land of a cutting edge;
FIGS. 6a and 6b are plan view and sectional view, respectively, showing how chip comes out on a conventional insert with a breaker groove when the depth of cut is small;
FIGS. 7a and 7b are similar views showing how chip comes out on a throwaway insert embodying the present invention;
FIG. 8 is a graph showing the cutting force applied to the insert embodying the present invention in comparison with the conventional insert;
FIG. 9 is a graph showing the durability of the insert of the present invention in comparison with the conventional insert; and
FIGS. 10 and 11 are plan views of conventional throwaway inserts.
FIG. 12 is a plan view of a rectangular insert showing another example of a land.

Referring to the drawings, FIGS. 1–4 show a triangle throwaway insert embodying the present invention. It is of a type allowing use of both sides.

A throwaway insert 10 is provided with a land 12 extending along and inside of a cutting edge 11. The width of the land 12 may be or may not be uniform. The land 12 may be a negative land parallel to the bottom surface (support face), as shown in FIG. 3, or a positive land with a rake angle $\theta$, as shown in FIG. 5. The width of land may be the smallest at each nose and increase until it becomes the largest at the middle of the cutting edge, as shown in FIG. 12.

A breaker groove 13 of a uniform width is formed on the rake face along and inside of the land 12. The portion enclosed by the breaker groove 13 is a flat central area 14 of a shape similar to the shape of the throwaway insert. The breaker groove 13 is the same as the one formed in the conventional insert. As seen in FIG. 3, the breaker groove is the deepest in the center and gradually becomes shallow toward the edge of the land 12 and the edge of the central area 14. The central area is higher by h (in FIG. 2) above the level of the cutting edge 11 to serve as the support face when the cutting edge on the back side is used. In the case of inserts of a type allowing use of both sides, the central area must be above, or at the same level as, the cutting edge. But with inserts of a type on which only one side is used, the central area may be below the level of the cutting edge.

At each corner of the central area 14, two semicircular (in plan view) projections 15 are formed so as to be symmetrical to each other with respect to a bisector o of each nose 16 and to contact with each other. (FIG. 1) Each projection 15 rises from midway of the breaker groove 13 until it becomes even with the central area 14, as shown in FIG. 4.

Similar projections 15' semicircular in plan view are arranged at uniform spacings 1 along the straight sides of the central area 14. The spacing 1 should preferably be substantially equal to the width W of the projection 15'.

With the conventional insert having a breaker groove, a narrow chip A produced in cutting with a small depth of cut is not satisfactorily curled and broken as shown in FIGS. 6a and 6b. In contrast, with the insert according to the present invention, even a narrow chip butts one of the projections 15 and satisfactorily curls itself, as shown in FIGS. 7a and 7b, because the projections 15 are provided adjacent to each other so as to enclose the corner of the central area. In cutting with large depths of cut or cutting by use of the straight portion of the cutting edge, the projections 15 and 15' act on the chip effectively and give it an irregular strain, even if it is very thin. Thus, the insert embodying the present invention exhibits a good chip breaking function over wide ranges of the depth of cut and the feed.

In comparison with the conventional insert, the cutting resistance or force is smaller, as seen on the graph of FIG. 8, because of a small contact area between the chip and the projections. Even if the projections 15, 15' should get worn due to abrasion by chip, the central area 14 will still remain wide, maintaining a sufficient support to prevent the insert from breakage. This is shown in the graph of FIG. 9 which compares the insert of the present invention with the conventional insert in durability.

Although the preferred embodiment is triangular, the present invention may be applied to any polygonal inserts including rectangular, rhombic and rhomboidal ones.

What we claim is:

1. In a polygonal throwaway insert having a cutting edge, a land provided along and inside of said cutting edge, a breaker groove of a uniform width extending along and inside of said land, and a flat central area enclosed by said breaker groove and having a shape symmetrical to the shape of the insert, the improvement comprising a pair of projections formed at each corner of said central area so as to be symmetrical to each other with respect to a bisector of the corner, and a plurality of projections arranged at regular spacings along each of the straight sides of said central area, all of said projections having a semicircular shape extending outwardly from said central area in plan and starting from midway of said breaker groove until they become even with said central area in elevation.

2. The polygonal throwaway insert as claimed in claim 1, wherein said central area is above said cutting edge.

* * * * *